Nov. 4, 1947.  A. E. ZOCK  2,430,202
COTTON HARVESTING
Filed Aug. 17, 1944
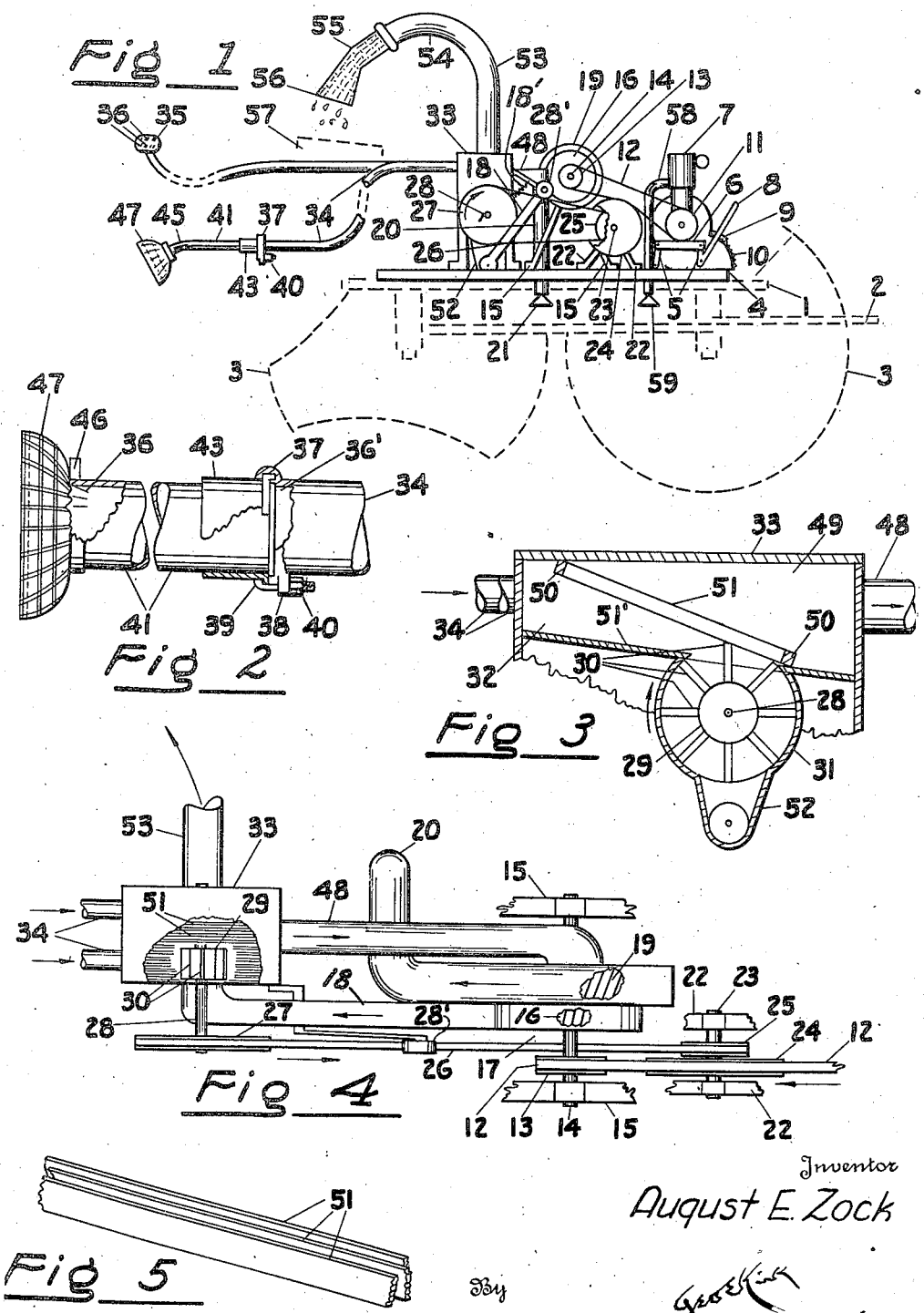
Inventor
August E. Zock
By
Attorney Patented Nov. 4, 1947

2,430,202

UNITED STATES PATENT OFFICE 2,430,202

COTTON HARVESTING

August E. Zock, Sault Ste. Marie, Mich.

Application August 17, 1944, Serial No. 549,825

1 Claim. (Cl. 302—23)

This invention relates to multi-service adaptable power-actuated equipment, having peculiar advantages in agriculture, even to the special service of harvesting such crops as cotton and the like.

This invention has utility when incorporated in suction, blower and separator assembly, in conjunction with work gathering and take-off equipment, more particularly for gathering from the field a crop of cotton and the packaging thereof.

Referring to the drawings:

Fig. 1 is a side elevation, with parts broken away, of an embodiment of the invention, for picking or gathering cotton from its bolls, cleaning the separated fiber stock and accumulating for bagging or other bulk transportation thereof;

Fig. 2 is an enlarged detail view of the work gathering duct section terminus, showing the swivel mounting for the intake nozzle, portions of the fragmentary showing being in section;

Fig. 3 is a detail view in vertical section lengthwise of the separator adapted for pneumatic removal of foreign matter fines;

Fig. 4 is a plan view, somewhat extended and diagrammatic, of the pneumatic equipment of Fig. 1, together with the driving means therefor; and Fig. 5 is a fragmentary perspective view of portions of the separator or screen mechanism of the equipment.

When put into service for harvesting, the invention hereunder may be placed upon a deck 1 of a wagon having a tongue or thills 2. In the instance of caring for a cotton crop, it is advantageous to have the hauling equipment astride a row of the crop. With such a purpose in view, it is desirable the wagon gear be of a light weight for carrying the cotton harvesting machine, including attachments and crop receiving receptacle; or the adaptation may be effected in connection with otherwise more general equipment, thru supply of extra rim or large diameter wheels 3.

The invention proper has adaptability advantages when such be assembled on a base 4. Near one end, say that as set up as forward on a wagon or truck to be taken afield, a shiftable or adjustable mounting may be provided, or by means of links 5 there is thus supported a base 6 for an internal combustion engine or prime mover 7. The parallel sets of links 5 mount the engine 7 to have its base 6 move at all times parallel to the major base 4. Fixed with the forward pair of links 5 is a hand lever 8 having a dog 9 to engage a quadrant 10 fixed with the base 4. There is thus readily and conveniently available to the operator, a quick and positive means for positioning of the prime mover 7 having a drive pulley 11 to actuate a V-belt 12 extending about a pulley 13 fixed to a shaft 14 carried by bearing brackets 15 rising from the base 4.

Mounted on the shaft 14 is a blower 16 having an intake 17 and a discharge duct 18. Adjacent the blower 16 is a suction fan or another blower 19 having a discharge duct 20, which may have a downwardly directed outlet at a flare or velocity-dissipating terminus 21, adjacent and preferably below the base 4 and laterally thereof to be clear of the cotton row.

Adjacent the motor 7, and between such motor and the blower-fan power actuated equipment, brackets 22 upwardly from the base 4, provide bearings mounting a shaft 23, upon which is a flat-faced pulley 24. With the hand lever 8 swung toward the engine 7, the V-belt 12 is slacked, and the motor 7 is thereby disconnected for starting clear of a load. When the motor 7 is started, a pulling of the lever 8 forward, not only tightens the V-belt 12 for such to drive the pulley 13, but it simultaneously has the outer flat side of such V-belt 12, pulled taut as to the outer lower face of its under reach against the top of the pulley 24. A pulley 25 fixed on the shaft 23 with and adjacent the pulley 24, is thus connected thru a belt 26 to drive a pulley 27 on a shaft 28. A belt tightener comprising a pulley 28' is yieldably held against the upper reach of the belt 26 by spring 18'.

A hub 29 is fixed on the shaft 28. Rubber or fabric blades 30 provide terminally flexible wings extending from the hub 29. At the normal speed of rotation for the shaft 28, there is sufficient centrifugal force to hold yieldably the free or outer ends of the blades 30 to wipe the inner walls of the housing 31 therefor. The housing 31 on its lower side has a chamber region 32. The separator chamber 32 is in the housing 33 and is above and in communication with the housing 31. The communication opening from the housing 33 to the housing 31 is an opening upwardly through which the wings 30 may swing. The wings 30 in the housing 31 serve as a rotary valve cutting off air draft between the housing 33 and the chamber 32.

The housing 33 provides a pivotal mounting for a slightly downwardly directed arm having at its free end the belt tightener roller 28' (Fig. 1) as the load for the tightener.

The housing 33 has the receiving chamber 32 effective thru suction upon ducts 34. The flexible ducts 34 may be equipped with a special oval head 35 (Fig. 1). Inwardly extending spaced tines or pins 36 may be at the head 35 and directed toward the duct 34. With suction draft at the head 35, a workman afoot may direct the head toward cotton plant carrying bolls to have the bolls of fiber drawn into the duct 34 en route to the separator housing 33. The head or nozzle 35 in practice may be 1¼" semicircular in form at its ends with its longer dimension between the mid points of such end from 3" to 3½". For such a dimension nozzle 35, the duct 34 may be 1¼" diameter.

In the preferred practice, at the free end of the duct 34 there is a countersunk seat 36' (Fig. 2). A claw or hook 37 extends thereover. Diametrically opposite from the hook 37, there is an eye 38. A hook 39 has a threaded stem therefrom extend thru the eye 38 to be there engaged by a nut 40, to adjust the hook 39 relatively to the duct 34. A tubular extension fitting or handle 41 has a swivel mounting at the duct seat 36'. For this mounting, there is loose on the handle 41 a sleeve 43 having an outer bounding rib at its end adapted to be engaged by the hooks 37, 39. In this assembly the sleeve 43 locates an outer bounding rib at the end of the handle 41 in the seat 36'. Adjustment of the nut 40 serves to effect this swivel joint assembly.

The swivel mounted handle 41 has an advantage in cotton boll pick-up when provided with a slight bend portion 51 (Fig. 1). There is more foliage to interfere with gathering cotton at the earlier portion of the season. Attaching means 46 may mount a flare screen 47 to overhang beyond the nozzle 35. This screen or foraminous guard allows the operator to thrust the nozzle 35 more readily thru the foliage to the vicinity of the cotton bolls. The various adaptations for the nozzle 35 extend its effective use in gathering the fiber, even as to adverse weather conditions having disturbed the boll as to tightness or fiber dislocation.

The fan 19 has a suction intake 48 providing the draft inward from the nozzles 35, thru the connection of the duct 48 to the housing 33. The fan 19 may establish in a region 49 of the housing 33 a subatmospheric pressure as low as 14" of mercury, and even up to 22". Efficient capacity for gathering even dew-dampened fiber, is had with the duct 48 in the range of 3½" to 4" in diameter with the two ducts 34 each 1¾" diameter connected to the chamber region 32 of the separator housing 33.

Between the region 32 with which the ducts 34 have direct communication and the region 49 with which the duct 48 has direct communication, there is partition frame 50 with closely spaced parallel slats 51. From above and adjacent the entrance of the ducts 34 to the housing 33, this partition 50, 51, inlines at an angle downwardly, herein as 20" long and in the range of 20°, to extend across the opening from the region 32 to the casing or valve housing 31. The flat strips or slats 51 may be of brass #16 gage as non-corrosive material, spaced 1/16" apart with their ½" width flat sides toward each other. The in-draft to the housing 33 from the ducts 34, thus has the region 32 in its cross-section decrease toward the rotary valve 29, 30. The carrying draft for the fiber is into the region 32 of the housing 33 below the partition 50, 51. The underside or edge portions of the slats 51 entrain the fiber to be released to the rotary valve, while the air escapes between the slats 51 into the region 49. The preferred practice for the partition 50, 51, is that its dip or downward inclination be more than 15°, but not as steep as 25°. The entraining effected by the slate is of the coarser or lighter fiber, while the fines, as dust and trash, tend to swirl thru the narrow slots between the slats 51 into the region 49, to be from there taken out by the duct 48 to the fan 19, for passing therefrom into the discharge duct 20.

The partition 50, 51, by having its narrow edges down at the fiber receiving region 32 of the housing 33, does not tend to cause the fibers to wind thereon or adhere thereto. The fiber accumulation, engaged by the partition 50, 51, is delivered by the rotary valve 29, 30, to a way 52 to one side of which the duct 18 extends from the blower 16.

With the separated-out fibers, there may be some leaves, carpels and seed. The duct 18 effects blowing across the way 52 to cause the fiber and other matter to flow thru a duct 53, a bend 54, past a screen or foraminous section 55 for air to exhaust and allow the fiber and other matter to pass thru an opening 56 into a bag 57.

In carrying out the practice hereunder, there is efficiency, not only in the initial investment, but in the special field operations, as well as range of adaptabilities therefor. Preferably with a tongue 2, the draft animals, say mules, may be one on each side of the row of cotton as to which the vehicle is astride. With two ducts 34, two operators may direct the nozzles 35 for the pick-up suctions to gather efficiently and quickly. According to the volume of crop being harvested, the mules may be allowed to take a slow pace, or progress intermittently, upon voice or line signals, or both, from one or other of the operators as in rear of the vehicle or wagon 1. Such vehicle 1 may have its deck of sufficient extent to carry one or more bags 57, say to the margin of the field.

It is to be noted that the several discharges are so designed that such may not agitate the released material. The harvested cotton falls by gravity from the discharge outlet 56 into a bag 57, thereby not inflating such bag. The foreign material removed by the separator 33 may be deposited in a way beside the row of cotton, by the spread spill 21, not to contaminate the still growing crop, nor disturb the operators by dusting toward them. The prime mover 7, when an internal combustion motor, may have its exhaust duct 58 in its transit thru a muffler to a downward dissipating spill 59, likewise in a row way not to annoy the crop gatherers at the tools 41, nor to disturb the row on either side of such spill 59.

Inasmuch as the base 4 is readily removed from the wagon deck 1, there is left open the general wide or normal use for the wagon, independent of haulage equipment for the harvester hereunder, with absence of necessity for special operator afield. Widening of the purposes for equipment uses may extend to dusting or insecticide treatments, in having connections to the pneumatic discharges, whether ducts 20, 18, or either. A variable speed power take-off at the pulley 11 may still further widen the out-of-season use possibilities for this special cotton harvester investment, which assembled units may have a total weight of as low as 300# even with a 3 H. P. motor 7.

What is claimed and it is desired to secure by Letters Patent is:

Portable harvesting equipment for fibrous material comprising a prime mover, a suction blower driven by said prime mover, a separator, duct means connecting the outlet side of said separator with the suction blower, manually controlled nozzle intake means duct-connected with the opposite inlet side of said separator, a partition in said separator, said partition being disposed at a slight angle with respect to a line extending between the inlet and the outlet of said separator and being formed of closely spaced and parallel slats disposed on edge, a valve housing forming a part of the separator and disposed below said partition, a rotary valve in said housing and provided with flexible blades adapted, during rotation, to wipe the lower edges of said partition slats whereby to direct the coarse fibrous material into said housing, a duct connected to said housing and extending to a point of discharge, a second blower also driven by said prime mover connected to said housing for forcing the coarse fibrous material out of said housing and thru said last named duct to said point of discharge, the arrangement being such that the fines and like waste material entering the separator from the intake nozzle means pass thru the partition and out of the outlet to said separator.

AUGUST E. ZOCK.

REFERENCES CITED

The following references are of record in the file of this patent:

UNITED STATES PATENTS

| Number | Name | Date |
|---|---|---|
| 418,087 | Thomas | Dec. 24, 1889 |
| 651,986 | Bateman | June 19, 1900 |
| 723,997 | Faulkner | Mar. 31, 1903 |
| 1,086,205 | Noble | Feb. 3, 1914 |
| 1,120,980 | Schofield | Dec. 15, 1914 |
| 1,130,847 | Schofield | Mar. 9, 1915 |
| 1,173,073 | Williams | Feb. 22, 1916 |
| 1,278,846 | Budd | Sept. 17, 1918 |
| 1,324,549 | Hulse | Dec. 9, 1919 |
| 1,605,196 | Ligon | Nov. 2, 1926 |
| 1,629,918 | Kastler | May 24, 1927 |
| 1,794,243 | Post | Feb. 14, 1931 |